United States Patent [19]

Müller

[11] Patent Number: 5,133,226
[45] Date of Patent: Jul. 28, 1992

[54] CONNECTING PART EQUIPPABLE WITH BALANCE WEIGHTS FOR CARDAN SHAFTS AND PROCESS FOR BALANCING

[75] Inventor: Karl-Heinz Müller, Wissen, Fed. Rep. of Germany

[73] Assignee: GKN Automotive AG, Siegburg, Fed. Rep. of Germany

[21] Appl. No.: 543,146

[22] Filed: Jun. 25, 1990

[30] Foreign Application Priority Data

Jul. 4, 1989 [DE] Fed. Rep. of Germany ....... 3921862

[51] Int. Cl.⁵ .............................................. F16F 15/22
[52] U.S. Cl. ..................................... 74/573 R; 74/572
[58] Field of Search ................................... 74/572-574

[56] References Cited

U.S. PATENT DOCUMENTS

| | | | |
|---|---|---|---|
| 3,838,464 | 9/1974 | Doyle | 74/573 |
| 4,241,620 | 12/1980 | Pichl et al. | 74/572 X |
| 4,711,610 | 12/1987 | Riehr | 74/573 R X |
| 4,716,761 | 1/1988 | Ito et al. | 74/573 R |
| 4,721,445 | 1/1988 | Hoffmann | 74/573 R X |
| 4,835,827 | 6/1989 | Marra | 74/573 R |
| 4,889,011 | 12/1989 | Steahly | 74/572 X |

FOREIGN PATENT DOCUMENTS

| | | | |
|---|---|---|---|
| 984796 | 1/1983 | U.S.S.R. | 74/573 R |
| 891902 | 3/1962 | United Kingdom | 74/573 R |

Primary Examiner—Vinh T. Luong
Attorney, Agent, or Firm—Akoo-Toren

[57] ABSTRACT

A connecting part for Cardan shafts, with a centering member on a drive end, a radial flange and a connecting stub for connecting the Cardan shaft of a motor vehicle on the shaft end, wherein the flange is equipped in its radially outer region with a plurality of prefabricated apertures for balance weights as well as a method for balancing such a connecting part of plastic material, wherein balance weights are inserted into preformed apertures in the flange defined by rotational measurements and are secured in their position by plastic or elastic deformation of the flange.

2 Claims, 2 Drawing Sheets

CONNECTING PART EQUIPPABLE WITH BALANCE WEIGHTS FOR CARDAN SHAFTS AND PROCESS FOR BALANCING

BACKGROUND OF THE INVENTION

FIELD OF THE INVENTION

The invention is directed to a connecting part for Cardan shafts having centering on the drive end, a radial flange and a connecting stub on the shaft for connecting a Cardan shaft of a motor vehicle.

Such connecting parts are used for connection with the drive units of a motor vehicle and with the Cardan shaft leading to the driven wheels. In order to avoid noises and vibrations caused by imbalances due to fabrication, especially in the material of the shaft tubes because of differing material densities and material accumulations, it is necessary to balance the assembled Cardan shafts in the region of the connecting parts. Hitherto, either bores were drilled at required points to lighten the shaft, or compensation weights were attached to the shaft, for instance by clamping or welding. Both these methods are, however, very time and material intensive and interfere with a desired fabrication cycle which is to be kept as uniform as possible.

SUMMARY OF THE INVENTION

Accordingly, it is an object of the present invention to provide a connecting part for the Cardan shaft of a motor vehicle, which can be fabricated and balanced with a low cost and effort.

Pursuant to this object, and others which will become apparent hereafter, one aspect of the present invention resides in providing the flange as a plastic material injection molded part that is equipped at its radially outer region with a plurality of molded apertures for receiving balance weights. In the invention, a connecting part is fabricated as a plastic material injection molded part, wherein the balance bores in the flange are preformed during fabrication. Since the bores are arranged in the flange, this facilitates accessibility. Through this measure, a connecting part for a Cardan shaft, especially for a Cardan shaft of composite material is created, which can be rapidly and simply balanced, should this be required, with simple means by insertion of balance weights, especially balance weights made of lead.

These apertures are configured in a favorable manner as axially extending dead end holes, which are especially arranged on a pitch circle of the flange extending concentrically to the centering. Fabrication of the connecting parts from thermoplastically deformable plastic material facilitates the later attachment of the individually inserted balance weights.

A further object of the invention is to create a simple method for balancing the connecting parts of Cardan shafts of motor vehicles.

This object is achieved by inserting balance weights into apertures determined by rotational measurements and preformed in the flange and by securing these balance weights in their position by thermoplastic deformation of the flange. A method is created by these features which permits balancing within the shortest time a plurality of connecting parts together with a Cardan shaft connected with them, with minimum effort and cost.

The flange can be heated ultrasonically in a favorable manner in the end region for securing the balance weights and can then be mechanically deformed. Apart from that, an also rapidly performable method for securing the weights is possible by hot embossing the region of the individual inserted balance weights using a suitable tool, for instance a soldering iron. Naturally, conventional fastening means such as gluing can also be utilized.

Another favorable embodiment can comprise elastic knobs or edges at the border of the apertures, which spring back and secure the balance weights after these having a larger diameter have been pressed in. The elastic members can be molded into the flange or can be mechanically produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
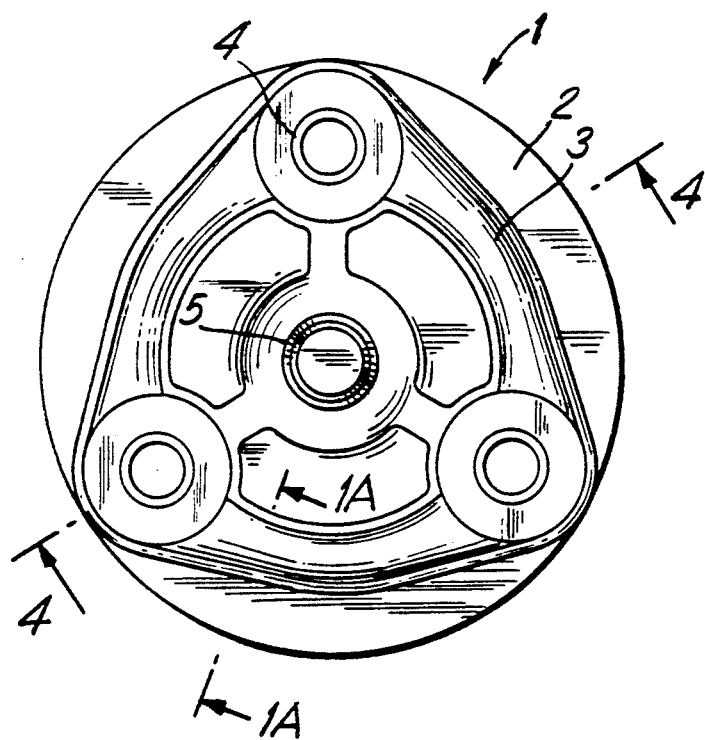
FIG. 1 is a plan view upon the drive side of a connecting part for a Cardan shaft.
Figure 1A:
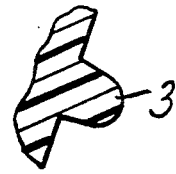
FIG. 1A is sectional view along the line 1A—1A in FIG. 1.

A connecting part 1 is shown in FIG. 1, and is a plastic material injection molded part. The part 1 essentially has a radially extending flange 2, axially extending ribs 3 molded integrally on the flange 2, and a centering means 5 at the drive end. Threaded lugs 4 are provided for connection with a power source, for instance the drive end of a vehicle clutch, which threaded lugs 4 consist of metal and carry knurling for better interconnection with the plastic material at the flange 2.

Figure 2:
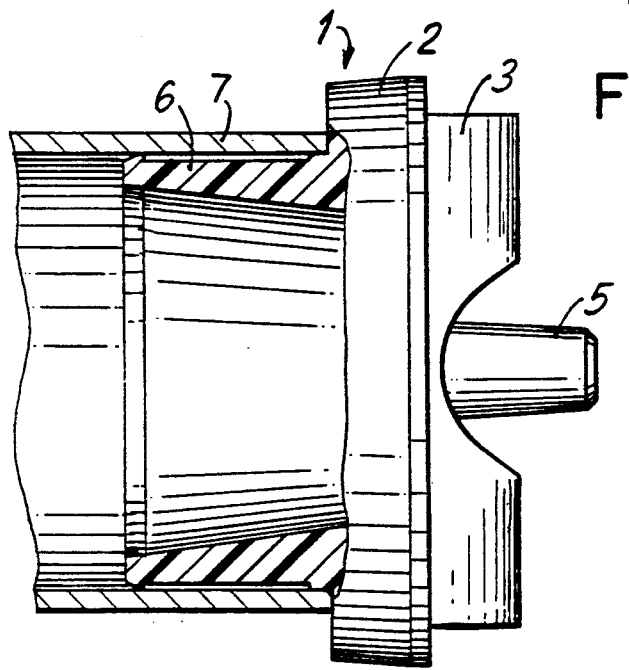
FIG. 2 is a side view with partial vertical section of the connecting part in FIG. 1, with inserted balance weights and a glued thereon Cardan shaft.

As shown in FIG. 2, a connector stub 6 is molded integrally to the flange 2 on the shaft side which is axially opposite to that carrying the centering means 5. The stub 6 serves for connection with a Cardan shaft 7 also fabricated from plastic material, which shaft is not shown in detail here. The Cardan shaft 7 is preferably bonded to the connecting part 1.

Figure 3:
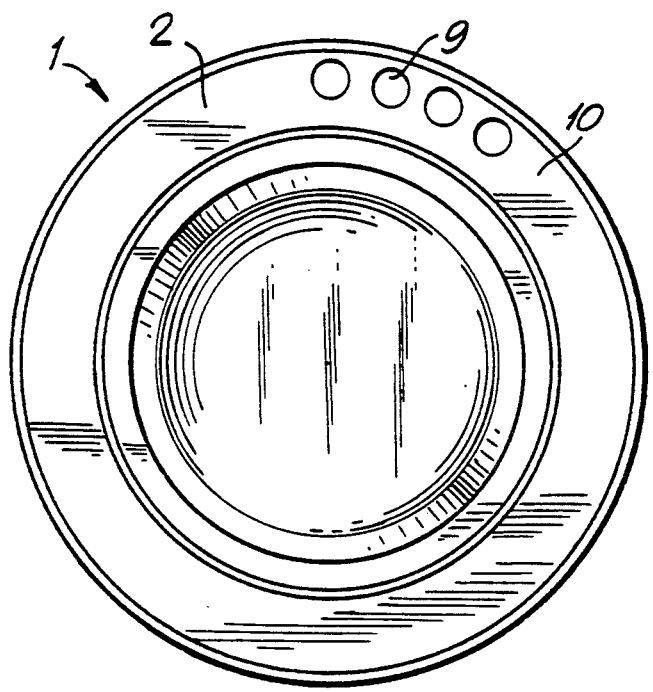
FIG. 3 is a plan view upon the shaft side of connecting part in FIG. 1, with a plurality of preformed apertures distributed uniformly across a pitch circle.

As shown in FIG. 3, the flange 2 is equipped with a plurality of apertures 9, which are formed during the course of the fabrication of this component produced by a plastic material injection molding process. The apertures 9 are uniformly distributed around a pitch circle 10 extending concentrically to the centering means 5. If required, meaning if the connecting part 1 and/or the shaft 2 are out of balance, which is to be compensated by one or several counterweights, balance weights 11 can be inserted into the corresponding apertures 9. The balance weights 11 consist preferably of metal.

Figure 4:
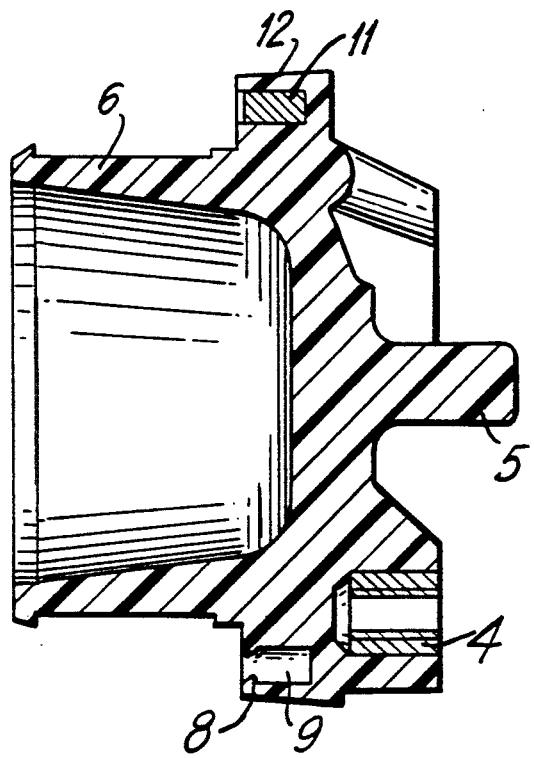
FIG. 4 is an axial section of a connecting part along the line 4—4 in FIG. 1.

As shown on the upper half of FIG. 4, a balance weight 11 is after insertion fixed and retained in position by a plastically deformed edge 12 of the flange 2. The thermoplastic deformation of the edge 12 occurs after heating by means of ultrasonics or by hot embossing. In the lower half of FIG. 4, it can be discerned that elastic knobs 8 are provided at the open ends of the apertures 9, which constrict the cross-section and thus secure a pressed-in balance weight.

While the invention has been illustrated and described as embodied in a connecting part which can be equipped with balance weights for Cardan shafts, and a process for balancing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A combination of a Cardan shaft and a plastic injection molded connecting part, comprising:
    a drive end on the connection part;
    centering means on said driven end;
    a connecting stub connected to said Cardan shaft;
    a radial flange between said drive end and said stub, said flange having a radial outer region provided with a plurality of molded-in, dead-end apertures which extend axially of said flange and have open ends for receiving balance weights, the apertures being provided on a pitch circle of the flange concentric with the centering means; and
    means for constricting said open ends of said apertures.

2. The combination according to claim 1, wherein the Cardan shaft is tubular and said stub is received within said shaft.

* * * * *